(12) United States Patent
Neumann

(10) Patent No.: US 11,615,371 B2
(45) Date of Patent: Mar. 28, 2023

(54) METHOD AND SYSTEM FOR INITIATING OBJECT TRANSFER

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

(*) Notice: Subject to any disclaimer, the term of this patent is extended or adjusted under 35 U.S.C. 154(b) by 16 days.

(21) Appl. No.: 17/106,377

(22) Filed: Nov. 30, 2020

(65) Prior Publication Data

US 2022/0172166 A1    Jun. 2, 2022

(51) Int. Cl.
*G06Q 10/08* (2012.01)
*G06Q 10/0835* (2023.01)
*G06Q 10/0834* (2023.01)

(52) U.S. Cl.
CPC ... *G06Q 10/08355* (2013.01); *G06Q 10/0834* (2013.01)

(58) Field of Classification Search
CPC .................. G06Q 10/08355; G06Q 10/0834
See application file for complete search history.

(56) References Cited

U.S. PATENT DOCUMENTS

| | | | |
|---|---|---|---|
| 10,489,738 B2 | 11/2019 | Clark et al. | |
| 10,708,733 B1 | 7/2020 | Yoo et al. | |
| 2007/0130054 A1* | 6/2007 | Jenniges | G06Q 40/12 705/37 |
| 2012/0023032 A1* | 1/2012 | Visdomini | G06Q 10/08355 705/338 |
| 2014/0278635 A1* | 9/2014 | Fulton | G06Q 10/083 705/7.14 |

(Continued)

OTHER PUBLICATIONS

Aliaa Alnaggar, Fatma Gzara, James H. Bookbinder, Crowdsourced delivery: A review of platforms and academic literature, Omega, vol. 98, 2021, 102139, ISSN 0305-0483, https://doi.org/10.1016/j.omega.2019.102139. (https://www.sciencedirect.com/science/article/pii/S030504831930578X) (Year: 2019).*

*Primary Examiner* — Resha Desai
*Assistant Examiner* — Carter P Brockman
(74) *Attorney, Agent, or Firm* — Caldwell Intellectual Property Law

(57) ABSTRACT

A system for initiating object transfer, the system comprising a computing device configured to receive a plurality of object transfer requests, generate, using the plurality of object transfer requests, a transfer apparatus interaction platform for a plurality of transfer apparatuses to proffer at least an object transfer request, determine transfer apparatus interaction data via the transfer apparatus interaction platform, wherein transfer apparatus interaction data comprises a proffer of an object transfer request, a proposed window of time for object transfer, and an object transfer compatibility metric, select the proffer from a plurality of proffers from the plurality of transfer apparatuses, wherein selecting comprises calculating a difference between the plurality of object transfer compatibility metrics associated with the plurality of proffers using a pairwise operation, and provide the transfer apparatus corresponding to the selected proffer the object transfer request.

20 Claims, 6 Drawing Sheets

(56) References Cited

U.S. PATENT DOCUMENTS

| | | | |
|---|---|---|---|
| 2016/0063436 A1* | 3/2016 | Coles | G06Q 10/08345 |
| | | | 705/335 |
| 2017/0286893 A1 | 10/2017 | Clark et al. | |
| 2018/0025298 A1* | 1/2018 | Baggott | G06Q 50/12 |
| | | | 705/332 |
| 2018/0060814 A1* | 3/2018 | Seaman | G06Q 10/0838 |
| 2018/0276614 A1* | 9/2018 | Blair, II | G08G 1/141 |
| 2019/0180229 A1* | 6/2019 | Phillips | G06Q 10/0833 |

* cited by examiner

METHOD AND SYSTEM FOR INITIATING OBJECT TRANSFER

FIELD OF THE INVENTION

The present invention generally relates to the field of path selections courier bidding for delivery. In particular, the present invention is directed to systems and methods for initiating object transfer.

BACKGROUND

A user may often elect not to receive an object because the user lacks the means to effectively transfer the object to the user-designated location.

SUMMARY OF THE DISCLOSURE

In an aspect, a system for initiating object transfer, the system including a computing device configured to receive a plurality of object transfer requests including a plurality of object identities and a plurality of object destinations, generate, using the plurality of object transfer requests, a transfer apparatus interaction platform for a plurality of transfer apparatuses to proffer at least an object transfer request, determine, a plurality of transfer apparatus interaction data having a plurality of proffers of object transfer requests, wherein determining includes determining, for each transfer apparatus of the plurality of transfer apparatuses a transfer apparatus proffer of an object transfer request, a proposed window of time for object transfer, and an object transfer compatibility metric, wherein the compatibility metric is determined as a function of receiving, from the transfer apparatus, at least a distance ability parameter corresponding to the distance a transfer apparatus is able to traverse, select a proffer from the plurality of proffers from the plurality of transfer apparatuses, wherein selecting includes calculating a plurality of differences between pairs of object transfer compatibility metrics of the plurality of object transfer compatibility metrics and selecting the proffer as a function of the plurality of differences, and provide the transfer apparatus corresponding to the selected proffer the object transfer request.

In another aspect, a method for initiating object transfer, the method including a computing device configured for receiving a plurality of object transfer requests including a plurality of object identities and a plurality of object destinations, generating, using the plurality of object transfer requests, a transfer apparatus interaction platform for a plurality of transfer apparatuses to proffer at least an object transfer request, determining, a plurality of transfer apparatus interaction data having a plurality of proffers of object transfer requests, wherein determining includes determining, for each transfer apparatus of the plurality of transfer apparatuses a transfer apparatus proffer of an object transfer request, a proposed window of time for object transfer, and an object transfer compatibility metric, wherein the compatibility metric is determined as a function of receiving, from the transfer apparatus, at least a distance ability parameter corresponding to the distance a transfer apparatus is able to traverse, selecting a proffer from the plurality of proffers from the plurality of transfer apparatuses, wherein selecting includes calculating a plurality of differences between pairs of object transfer compatibility metrics of the plurality of object transfer compatibility metrics and selecting the proffer as a function of the plurality of differences, and providing the transfer apparatus corresponding to the selected proffer the object transfer request.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a transfer apparatus interaction platform for initiating object transfer. In an embodiment, a computing device is configured to receive a plurality of object transfer requests, wherein the plurality of object transfer requests includes a plurality of object identities and destinations. The computing device may generate a transfer apparatus interaction platform via a computer network to provide a plurality of transfer apparatuses the ability to interact using the interaction platform by placing proffers for object transfer requests. Transfer apparatus interaction data may include the proffer, a period of time the transfer apparatus may be available to perform the object transfer request, and input data corresponding to the distance the transfer apparatus may travel, for instance, prior to refueling. Computing device may calculate a compatibility metric for the transfer apparatus based on the interaction data sent via the interaction platform. Such a compatibility metric may serve as the proffer's "value", wherein the transfer apparatus proffer may be selected as the "winning proffer" for the object transfer request as a function of the transfer apparatus' compatibility metric.

Figure 1:
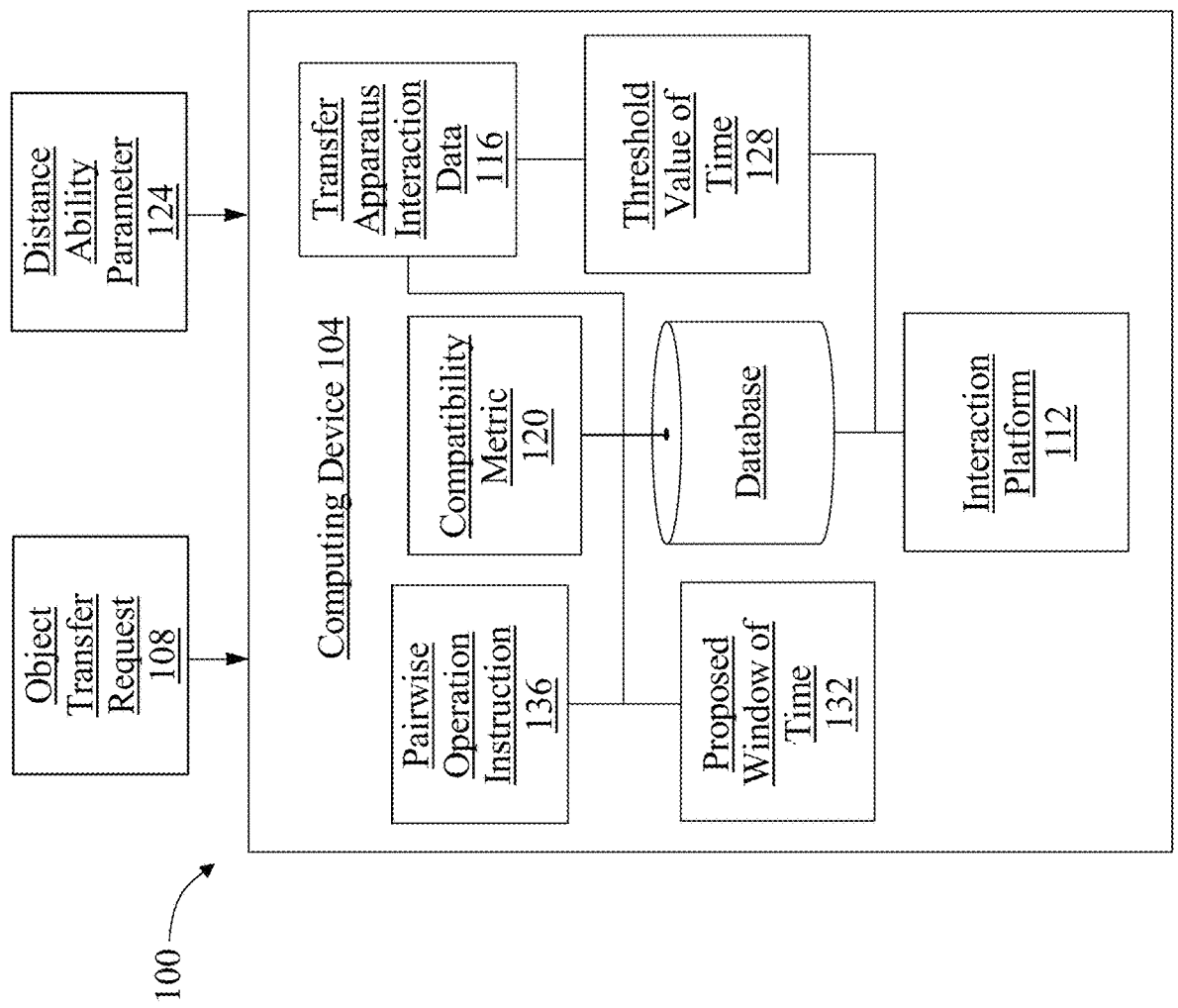
FIG. 1 is a block diagram illustrating an exemplary embodiment of a system for initiating object transfer.

Referring now to FIG. 1, an exemplary embodiment of a system 100 for initiating object transfer is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or "smartphone". Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices, for instance as is performed with a computer network. Examples of a network interface device include, but are not limited to, a network interface card (e.g., a mobile network interface card, a LAN card), a modem, and any combination thereof. Examples of a network include, without limitation, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices, components of computing devices such as cores of a central processing unit (CPU), graphical processing units (GPUs), and the like, of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 is configured to receive a plurality of object transfer requests, wherein the plurality of object transfer requests includes a plurality of object identities and a plurality of object destinations. An "object transfer request," as used in this disclosure, is a user-generated request for an object. An object transfer request 108 may include an object identity, wherein the identity comprises a variety of data, for instance the name/type of the object, the price, transfer conditions (such as refrigeration, handling with care, etc.), the object originator identity and location, among other data. An "object originator," as used in this disclosure, is an entity described as the supplier, retailer, manufacturer, etc. from which an object is requested. Object originator may be simply referred to herein as an "originator." An object transfer request 108 may include an alimentary element, such as a meal, menu item, grocery item, nutrition supplement, beverage, and the like. An object transfer request 108 may include item(s) purchasable from an originator, such as a grocery store item, retail store item, department store item, and the like. An object transfer request 108 may include personal items, such as medications, treatments, first-aid items, over-the-counter remedies, toiletries, and the like. An object transfer request 108 may include retail items such as apparel, jewelry, wearables, and the like. An object transfer request 108 may include items prone to transfer from an originator to a user-specified location due to freight, dimensions, among other factors, such as furniture, household appliances, exercise equipment, construction materials, and the like. An object transfer request 108 may include an object destination. An "object destination," as used in this disclosure, is a terminal location associated with the transfer of an object. An object transfer request 108 may include an object destination that is a residential location such as a house and/or apartment, a business location, building, research park, store, warehouse, among other destinations associated with an object.

Continuing in reference to FIG. 1, "transfer," as used in this disclosure is physical transfer of an object over a distance. A "transfer apparatus," as used in this disclosure is a is an apparatus suitable for physically transferring an object. A transfer apparatus may include an apparatus that is associated with, incorporated in, and/or operated by computing device 104 and/or an individual. A transfer apparatus may include autonomous vehicles, drones, robots, and the like used for physically transferring an object. A transfer apparatus may include traditional vehicles, such as user-operated bicycle, motorcycle, car, truck, plane, etc.

Continuing in reference to FIG. 1, computing device 104 is configured to generate, using the plurality of object transfer requests 108, a transfer apparatus interaction platform for a plurality of transfer apparatuses to proffer at least an object transfer request 108. An "interaction platform," as used in this disclosure, is an interaction technique, user interface technique, and/or input technique functioning as a combination of hardware and software elements that provides a way for transfer apparatuses to accomplish the task of selecting object transfer requests 108.

Continuing in reference to FIG. 1, interaction platform 112 may include interaction platforms of differing levels of granularity, wherein interactions may take the form of proffers submitted by a plurality of transfer apparatuses. Interaction techniques are usually characterized at various levels of granularity, or the level of detail, or summarization, of the units of data in the database, computing network, server, and the like. For instance, the level of technology, platform, and/or implementation-dependent software and hardware for implementing the interaction platform. In non-limiting illustrative examples, interaction platform 112 may display to transfer apparatuses the number and status of proffers submitted amongst the plurality of transfer apparatuses for a single object transfer request, representing a case of low-level granularity; however, the "hidden layers" of the interaction platform operating on the computing device 104 may include data corresponding to the status of the transfer apparatus including the current location, transfer apparatus capacity, and transfer apparatus distance ability prior to refueling/recharging. In such an example, the granularity of the "hidden layers" of the interaction platform—not shown to the transfer apparatuses—may carry data that is useful to computing device 104 for determining the 'value' of the proffers for object transfer request 108. Interaction techniques exist that are specific to various devices, such as mobile devices, touch-based displays, traditional mouse/keyboard inputs, and other paradigms, in other words, they are dependent on a specific technology or platform. In contrast, viewed at higher levels of granularity, interaction is not tied to any specific technology or platform. The interaction of 'filtering', for example, can be characterized in a way that is technology-independent, for instance, performing an action such that some information is hidden and only a subset of the original information remains. Such an interaction could be implemented using any number of techniques, and on any number of platforms and technologies.

Continuing in reference to FIG. 1, interaction platform 112 may receive an interaction task, or "the unit of an entry of information by the transfer apparatus", such as entering a datum of text, issuing a command, or specifying a 2D position, for instance on a map. A similar concept is that of domain object, which is a datum of application data that may be manipulated by the transfer apparatus. Interaction techniques are the "glue" between physical I/O devices and interaction tasks, or domain objects. Different types of interaction techniques may be used to map a specific device to a specific domain object, for instance, in identifying which transfer apparatus a proffer originates and identifying its location.

Continuing in reference to FIG. 1, interaction platform 112 may include any user interface (UI), graphical user interface (GUI), or interaction technique and/or method suitable for allowing transfer apparatus to submit proffers for object transfer requests. Interaction platform 112 may include 3D interaction techniques, different types of user interfaces, input devices, interaction designs, interactivity, information visualization, visual analytics, and graphical widgets (graphical control elements/controls). Persons skilled in the art, upon review of this disclosure in its entirety, will be aware the various methods, techniques, and technology suitable for implementing the transfer apparatus interaction platform 112 for receiving transfer apparatus interaction data and proffers.

Continuing in reference to FIG. 1, generating transfer apparatus interaction platform 112 may include determining a time frame for the plurality of transfer apparatuses to provide at least a proffer and providing to the plurality of transfer apparatuses at least an unfinished object transfer request 108. Interaction platform 112 may include forums and/or virtual spaces, wherein each is a place on the platform corresponding to an object transfer request 108 for submitting proffers. Computing device 104 may determine a time frame for each virtual space for submitting proffers for each object transfer request 108. Computing device 104 may determine, for instance from data associated with object transfer request 108, the estimated and/or anticipated transfer time. For instance, an expected time may include the time a user was informed to expect an object to arrive at the terminal destination. Computing device 104 may retrieve such data from the object transfer request 108 input and/or may calculate the time required to complete an object transfer request 108 by retrieving identifying data from the request. Calculating may include determining the timing and manner of the object transfer request 108, for instance using identifiers associated with the object regarding transfer, such as "rush delivery", "2-3 business days", and the like. In such an event, computing device 104 may calculate, or otherwise determine, for instance using a mapping application, along with the originator location, terminal destination, and current locations of a plurality of transfer apparatuses, an appropriate amount of time for fielding proffers while maintaining an "on time" transfer timeline according to the time when the request was received.

Continuing in reference to FIG. 1, computing device 104 is configured to determine transfer apparatus interaction data via the transfer apparatus interaction platform 112, wherein the transfer apparatus interaction data includes a proffer of an object transfer request, a proposed window of time for object transfer, and an object transfer compatibility metric. "Transfer apparatus interaction data," as used in this disclosure, is a packet of data as an input for the interaction platform 112 that contains elements of data corresponding to a transfer apparatus proffer made to an object transfer request 108. Transfer apparatus interaction data 116 includes a "transfer apparatus proffer" of an object transfer request 108, wherein the "proffer," as used in this disclosure, is an acceptance, or a bid of an offer for performing an object transfer request 108. Transfer apparatus interaction data 116 includes a "proposed window of time for object transfer," as defined in further detail below. Transfer apparatus interaction data 116 includes an object transfer compatibility metric. A "compatibility metric," as used in this disclosure, is a qualitative and/or quantitative metric that describes the "compatibility" of a transfer apparatus for an object transfer request 108. Object transfer compatibility metric, may be simply referred to herein as a "compatibility metric."

Continuing in reference to FIG. 1, compatibility metric 120 is determined as a function of receiving, from the transfer apparatus, at least a distance ability parameter corresponding to the distance a transfer apparatus is able to traverse. A "distance ability parameter," as used in this disclosure, is a datum that describes the distance a transfer apparatus is able to cover for an object transfer request 108. A distance ability parameter 124 may include a qualitative datum, for instance the status of fuel on a vehicle as "empty", "full", "quarter-tank", etc. A distance ability parameter 124 may include a qualitative datum such as the distance in miles of fuel range or the percentage charge an electric vehicle has left to travel prior to recharge. A distance ability parameter 124 may include the number of object transfer requests 108 a transfer apparatus may fulfill before needing to return to a "home base", fuel station, charging station, or the like. A distance ability parameter 124 may include the distance a transfer apparatus may travel prior to transfer apparatus personnel swap, for instance the distance that may be traveled given the time left on an individual's work shift. A distance ability parameter 124 may include any data that materially affects the distance and/or time a transfer apparatus may physically transfer an object, wherein the data can be retrieved from the transfer apparatus, computing device associated with transfer apparatus, and/or individual operating transfer apparatus.

Continuing in reference to FIG. 1, transfer apparatus interaction data 116 may include at least a distance ability parameter 124 that computing device 104 may use for determining an object transfer compatibility metric 120. Computing device 104 determining compatibility metric 120 may include retrieving the distance required for object transfer request 108 and determining if transfer apparatus can cover such a distance according to a distance ability parameter 124. In non-limiting illustrative examples, computing device 104 may perform a mathematical operation, such as subtraction, to determine if the distance ability parameter 124 (which may include a range of distance in miles) is greater than the distance required to fulfill object transfer request 108. In further non-limiting illustrative examples, computing device 104 may use a mapping application, algorithm, navigation tool, or the like, such as GOOGLE MAPS and the Internet, to determine the time and distance an object transfer request 108 may require and compare this value of distance and time to the time left on a transfer apparatus individual's shift and distance of range the transfer apparatus can travel to determine if such a distance and time is feasible to be covered. In such an example, computing device 104 may determine a compatibility metric 120 that is a lower numerical value for a request that cannot be fulfilled, and a higher numerical value for a request that may be fulfilled. Compatibility metric 120 may include a qualitative value such as a binary system of "yes/no", "true/false"; alternatively or additionally, compatibility metric 120 may be expressed as a qualitative metric such as a numerical value, percentile compatibility, or the like.

Continuing in reference to FIG. 1, determining transfer apparatus interaction data 116 via the transfer apparatus interaction platform 112 may include generating a threshold value of time for accepting the proffer of an object transfer request 108 from the plurality of transfer apparatuses. A "threshold value of time," as used in this disclosure, is a time period for allowing an object transfer request 108 to remain pending on the interaction platform 112. Computing device 104 may determine to only provide pending object transfer requests 108 by generating a 'threshold hold value of time 128' to maintain the virtual space via the interaction platform 112 "open" for the object transfer request 108. Computing device 104 may generate such a threshold value of time 128 by determining the maximal amount of time an object transfer request 108 may remain pending before closing the proffer period and assigning the object transfer request 108 to a transfer apparatus, or otherwise remanding the request to another source. Computing device 104 may determine threshold value of time 128 by retrieving data from the object transfer request 108 for instance using a mapping application, along with the originator location, terminal destination, and current locations of a plurality of transfer apparatuses, an appropriate amount of time for fielding proffers while maintaining an "on time" transfer timeline according to the time when the request was received. Computing device 104 may use threshold value of time 128 to automatically close the virtual space for fielding proffers and assign the object transfer request 108. In this way, only pending object transfer requests 108 may be provided via the interaction platform 112. Furthermore, object transfer requests 108 may be proffered for without the time expiring, or the requests resulting in not being assigned or completed within a reasonable or appropriate time frame.

Continuing in reference to FIG. 1, transfer apparatus interaction data 116 may be displayed to the plurality of transfer apparatuses via the transfer apparatus interaction platform 112. In non-limiting illustrative examples, the status and number of proffers may be provided to all transfer apparatuses of the plurality of transfer apparatuses that can view a virtual space for an object transfer request 108. Compatibility metric 120 may also be displayed to the plurality of transfer apparatuses. In this way, information is communicated to the plurality of transfer apparatuses regarding the 'position' and/or 'suitability' of their associated proffer relative to other transfer apparatuses placing proffers. Correspondingly, it may become evident to transfer apparatuses via the interaction platform 112 if their proffer will be selected over others, or where their proffer ranks among other proffers. For instance and without limitation, a transfer apparatus that has been selected for a plurality of object transfer requests 108 may observe that their proffer is "ranked" lower than another's due to a lower compatibility metric 120 according to the distance required to fulfill currently assigned requests. In such an example, transfer apparatus may understand that he or she currently commands more object transfer requests 108 than another, and may focus on completing the pending, assigned object transfer requests 108.

Continuing in reference to FIG. 1, computing device 104 may generate a list of available transfer apparatuses as a function of the plurality of compatibility metrics 120 for performing the plurality of object transfer requests 108. Computing device 104 may generate a list that comprises only transfer apparatuses that may elect to submit a proffer via the interaction platform 112. Computing device 104 may generate such a list, for instance, as a function of a plurality of compatibility metrics 120. For instance and without limitation, computing device 104 may generate a list that eliminates the potential for transfer apparatus with less than a particular amount of time left on an individual's work shift. In such an example, computing device 104 may retrieve a plurality of compatibility metrics 120 and an associated plurality of transfer apparatus identities, for instance from a database, such as a NOSQL database, key-retrieval database, relational database, cloud database, or the like, as described in further detail below, and generate a list that excludes transfer apparatuses that may not meet a criteria for completing an object transfer request 108 within a determined window of time. This way, the virtual space for an object transfer request 108 via the interaction platform 112 may be made available to the appropriate transfer apparatuses, and proffers may only be submitted from the appropriate transfer apparatuses.

Continuing in reference to FIG. 1, determining the proposed window of time for object transfer may include determining, from the list of available transfer apparatus, a first position for the transfer apparatuses and generating the proposed window of time for object transfer for the transfer apparatus as a function of the first position. As used in this disclosure, the "proposed window of time," refers to an amount of time it takes a transfer apparatus to travel from a first position (such as a current location), to an originator to retrieve an object, and to transfer the object to the terminal destination. Computing device 104 may determine, from a 'list of available transfer apparatus', such as transfer apparatuses indicating an 'active' status, transfer apparatuses "logged on" to interaction platform 112, or otherwise indicating a willingness to accept object transfer requests 108. A list of available transfer apparatuses may include a file denoting the identities and current locations of transfer apparatuses using interaction platform 112. Computing device 104 may calculate a proposed window of time 132 for instance by obtaining GPS data corresponding to a first position of a transfer apparatus and receiving a transfer path for the transfer apparatus from the first position to the object request location(s). A transfer path may be stored and/or retrieved from a database, such as a database storing transfer routes that minimize distance and/or time. A transfer path may be determined by a mapping application, tool, and/or algorithm, and the Internet, such as GOOGLE MAPS. Computing device 104 may calculate a proposed window of time 132, for instance and without limitation, by adding the distances of the paths and calculating the time necessary to traverse the path. The proposed window of time 132 may be a time represented as a numerical value in minutes, second, hours, or the like.

Continuing in reference to FIG. 1, proposed window of time 132 may include the calculated and/or predicted amount of time it may take a transfer apparatus to complete the current pending object transfer requests 108 assigned. In non-limiting illustrative examples, proposed window of time 132 may then include a numerical value describing the amount of time it would take a transfer apparatus to travel from the terminal destination of a prior request, to the originator location of a new object transfer request 108, to the terminal object destination of the new transfer request 108. In such an example, computing device 104 may receive a distance ability parameter 124 from the transfer apparatus which indicates if the summation of that distance may be completed prior to refueling, shift end, recharging, etc. This may aid in "dovetailing" a plurality of object transfer requests 108 assigned to one or more transfer apparatuses, where completion of a first object transfer request 108 places the transfer apparatus in a better first position for performing the next object transfer request 108. The compatibility metric 120 may be generated by computing device 104 as a function of the proposed window of time as an input; for instance the 'compatibility' of a transfer apparatus for an object transfer request 108 may be based on the amount of time it takes the transfer apparatus to complete the request from where the apparatus is currently location compared to where the object must be obtained and where it is to be transfer to.

Continuing in reference to FIG. 1, computing device 104 may determine if the proposed window of time 132 and compatibility metric 120 are suitable for allowing a transfer apparatus to submit a proffer for the object transfer request 108. In this way, virtual spaces for object transfer requests 108 may accept proffers that are optimized, as least in part. Transfer apparatus interaction data 116 may include a calculated proposed window of time 132 for a transfer apparatus as part of the proffer submitted by that transfer apparatus. The "value" of the transfer apparatus proffer may include the amount of time it may take a transfer apparatus to complete the object transfer request 108. The proposed window of time 132 may be used to determine a compatibility metric 120, for instance, how 'compatible' a transfer apparatus may be in completing a particular object transfer request 108 within an allotted amount of time. In this way, transfer apparatuses may submit more "valuable" proffers if the proposed window of time 132 indicates an object transfer request 108 can be expeditiously completed.

Continuing in reference to FIG. 1, determining the compatibility metric 120 may include receiving at least a distance ability parameter 124 associated with a transfer apparatus. Computing device 104 may receive distance ability parameter 124, as described above, directly from transfer apparatus, for instance using the Internet (such as via Wi-Fi connection to the same device network), via Bluetooth, etc., to interact via the interaction platform 112. Transfer apparatus interaction data 116 may include at least a datum that corresponds to a distance ability parameter 124. Computing device 104 may receive distance ability parameter 124 via interaction platform 112, for instance as user input, via a graphical user interface displaying graphical icons, textual submission, and the like. Computing device 104 may determine compatibility metric 120 using a plurality of distance ability parameters 124, for instance and without limitation, using data from a variety of source such as via a mapping application showing transfer apparatus current location, transfer apparatus charge/fuel level, and user input regarding number of unfinished, assigned object transfer requests 108.

Continuing in reference to FIG. 1, compatibility metric 120 may be calculated as a numerical value. Computing device 104 may calculate compatibility metric 120 using a mathematical operation, for instance and without limitation, calculating a sum of a variety of parameters such as a plurality of distance ability parameters 124 to provide a total range of distance a transfer apparatus may be capable of and comparing that distance range to the distance required for fulfilling an object transfer request 108. In such an example, compatibility metric 120 may be a numerical value calculated from the sum and after subtraction of the distance value for the object transfer request 108.

Continuing in reference to FIG. 1, calculating compatibility metric 120 may include generating a function, vector, matrix, array, operator and/or other mathematical operation for manipulating elements, for instance and without limitation, using a machine-learning algorithm. Machine-learning algorithms may be used for calculating compatibility metrics 120 by computing device 104 performing determinations, classification, and/or analysis steps, methods, processes, or the like as described in this disclosure using machine learning processes. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Training data for a machine-learning process may include generating a machine-learning model using training data that relates to distance ability parameters 124 associated with a transfer apparatus. Training data may include the destinations and expected arrival times of outstanding object transfer requests 108 and an individual's weekly work schedule, wherein the training data may be available to a machine-learning algorithm to determine optimal object transfer request 108 scheduling for the transfer apparatus. Machine-learning algorithm may include a supervised machine-learning algorithms, such as linear regression, k-nearest neighbors, naïve Bayes, neural networks, among other suitable supervised learning algorithms. Machine-learning algorithm may include unsupervised machine-learning algorithms, such as dimensionality reduction, clustering algorithms, among other suitable unsupervised learning algorithms. Calculating compatibility metric 120 using a machine-learning algorithm may include generating a function graphing the time and/or distance ability of a transfer apparatus as a function of the proposed window of time 132 for object transfer, wherein each object transfer request 108 will have a different function as the destination, expected object transfer time, etc. represent different variables between requests.

Continuing in reference to FIG. 1, in non-limiting illustrative examples, a function of a transfer apparatus distance ability parameter 124, minus the sum of the distance required by the outstanding object transfer requests 108 (as described above) may provide a current allotted distance available for completing a request, and compatibility metric 120 may be calculated as a function of how "compatible" that distance is with completing an object transfer request 180, for example throughout an individual's work shift. Compatibility metric 120 may be determined from a function, or a plurality of functions, such as with a system of equations. A system of equations may be a finite set of equations, each describing a parameter involved in calculating the compatibility metric 120, such as a distance ability parameter 124, proposed window of time 132, number of outstanding object transfer requests 108 already allotted to transfer apparatus, etc., wherein an equation may be dedicated to each. Alternatively or additionally, a single, multi-variable equation may be used to calculate a compatibility metric 120, such as a polynomial equation (linear, quadratic, cubic, etc.), wherein the terms of the equation may relate to individual parameters, and the coefficients are the numerical values related therein.

Continuing in reference to FIG. 1, compatibility metric 120 may be calculated using an objective function. An "objective function," as used in this disclosure, is a mathematical function that may be used by computing device 104 to score each possible pairing of a compatibility metric 120 (or object transfer request 108) with a transfer apparatus, wherein the objective function may refer to any mathematical optimization (mathematical programming) to select the 'best' element from a set of available alternatives.

Continuing in reference to FIG. 1, in non-limiting illustrative examples, computing device 104 may compute a plurality of compatibility metric 120 associated with each transfer apparatus (given a plurality of constraints and/or parameters, as described above) and select pairings (compatibility metrics 120 paired to transfer apparatus) to minimize and/or maximize the score, depending on whether an optimal result is represented, respectively, by a minimal and/or maximal score. In such an instance, the 'best' element from the plurality of available elements may be the most appropriate, or otherwise correct, compatibility metric 120, given a plurality of variables and/or constraints. Compatibility metric 120 may be calculated using a 'loss function' and/or 'cost function,' which is a function that maps an event or values of one or more variables onto a real number intuitively representing some "cost" associated with the event. Calculating a compatibility metric 120 may be represented as an optimization problem seeking to minimize a loss function, wherein the minimized value is the most appropriate and/or correct compatibility metric 120 for a transfer apparatus. This way, proffers associated with compatibility metrics 120 may be selected based on the compatibility metric 120 as it may represent a mathematical representation of the compatibility of a transfer apparatus for an object transfer request 108.

Continuing in reference to FIG. 1, compatibility metric 120 may be calculated using a multi-objective optimization (also known as multi-objective programming, vector optimization, multicriteria optimization, multi-attribute optimization or Pareto optimization) where multiple criteria decision-making is concerned with mathematical optimization involving more than one objective function to be optimized simultaneously. Compatibility metric 120 may be calculated using a multi-optimization objective function, for instance, where a plurality of variables are present, including the proposed window of time 132, distance availability parameter 124, transfer apparatus interaction data 116, the availability and number of transfer apparatuses using the interaction platform 112, the current number and distances of outstanding object transfer requests 108 for each transfer apparatus, among other variables and/or parameters. Compatibility metric 120 may then be calculated using the multi-objective optimization objective function, wherein optimization may include achieving a compatibility metric 120 with a maximum, minimum, and/or particular range of numerical values, wherein the numerical value considers the "compatibility" of the metric for a transfer apparatus, given the input of parameters described.

Continuing in reference to FIG. 1, compatibility metric 120 may include a calculation using a plurality of inputs, wherein the plurality of inputs represent a plurality of distance ability parameters 124, and the output is a compatibility metric 120, represented for instance by a numerical value, that system 100 may use for determining the 'value' of a transfer apparatus proffer for an object transfer. Compatibility metric 120 may be calculated using an equation that considers a weighted value for each distance ability parameter 124. For instance and without limitation, distance ability parameters 124 may be modified by expressions such as time needed to accommodate a distance associated with traversing a path associated with an object transfer request 108 subtracted from the time left on an individual's shift to determine if there is enough time left for such an individual to complete the object transfer. In such an example, if not enough time is left, computing device 104 may preclude the transfer apparatus from submitting the proffer; alternatively or additionally, transfer apparatus may submit a proffer, but the compatibility metric 120 may signal a low relative value, indicating the proffer should not be selected.

Continuing in reference to FIG. 1, computing device 104 may calculate a likelihood a transfer apparatus with a corresponding distance ability parameter 124 will perform an object transfer prior to a maximal time for the object transfer. As used in this disclosure, the "maximal time" represents an anticipated object transfer time. Maximal time for object transfer may include an expected and/or anticipated delivery time provided to a user, for instance at the moment of placing an object transfer request 108. Alternatively or additionally, the maximal time for an object transfer may include a calculated, estimated, and/or predicted maximal time, for instance as an estimated transfer time calculated for when an object may reach a destination. In non-limiting illustrative examples, the maximal time for object transfer time may serve as useful in determining which proffer from the plurality of transfer apparatuses represents a proffer that could be feasibly entertained within a designated time. Computing device 104 may calculate a probability describing such a relationship represented, for instance, as a numerical value that is a probability representing the ability, or likelihood, transfer apparatus may complete an object transfer request 108. Computing device 104, may sort, compare, and/or otherwise discriminate between compatibility metrics 120 as a function of the likelihood a transfer apparatus may complete an object transfer request on time. Computing device 104 may determine a probability describing a likelihood a transfer apparatus may perform an object transfer request 108 as a function of a distance ability parameter 124, for instance, using a current location of a transfer apparatus, number of outstanding object transfer requests 108, and travel range. Computing device 104 may calculate a compatibility metric 120 of a transfer apparatus for a particular object transfer request 108 as a function of the probability. Alternatively or additionally, compatibility metric 120 may include probability determined from a distance ability parameter 124.

Continuing in reference to FIG. 1, interaction platform 112 may display likelihood probabilities associated with the plurality of transfer apparatuses. Transfer apparatuses may communicate amongst each other, for instance by placing a proffer to alleviate object transfer requests 108 among their peers. In such an example, transfer apparatuses may be provided indications of the likelihood a transfer apparatus may complete an object transfer request 108 and elect to bid for one of their outstanding object transfer requests 108. A first transfer apparatus may retroactively place a proffer for a transfer request 108 already assigned to a second transfer apparatus, for instance, as a function of changes in the compatibility metric 120 of the first and/or second transfer apparatus.

Continuing in reference to FIG. 1, computing device 104 may select a proffer in the transfer apparatus interaction data by generating a pairwise operation instruction for selecting a proffer as a function of the plurality of compatibility metrics 120. A "pairwise operation instruction," as described herein, is an instruction and/or rule that computing device 104 may use to determine which proffer should be selected. A pairwise operation may include any mathematical operation used for comparing between two or more compatibility metrics 120. Pairwise operation may include subtraction between compatibility metrics 120, for instance, wherein two numerical values representing compatibility metrics 120 are compared by subtraction and the higher numerical value represents the proffer that is selected. Pairwise operation may include global pairwise operations, such as generating an array of a plurality of compatibility metrics 120, comparing all at once, and selecting a proffer as a function of its value relative to the other compatibility metrics 120. Pairwise operation may include local pairwise operations such as generating a list of compatibility metrics 120 and selecting local "solutions" wherein a proffer is selected as a function of its value relative to compatibility metrics 120 nearby in the list.

Continuing in reference to FIG. 1, a pairwise operation instruction 136 may include instructions for selecting compatibility metrics 120 for pairwise comparison. Instruction may include for instance a numerical value, range of values, or the like, to compare compatibility metrics 120, such as only comparing metrics above a certain value. In non-limiting illustrative examples, if the scale for compatibility metrics 120 was between 0-100, instruction may include only comparing compatibility metrics between 70 and 90 and/or selecting the compatibility metric 120 closest to a certain value. The compatibility metric 120 that is selected may represent the proffer that is selected, which corresponds to the identity of the transfer apparatus to receive the object transfer request 108.

Continuing in reference to FIG. 1, computing device 104 selecting a proffer may include calculating a plurality of differences between pairs of object transfer compatibility metrics 120. Computing device may calculate a "proffer delta", or difference value, between proffers for selecting a proffer. Calculating a proffer delta may include calculating a difference (delta) between two or more compatibility metrics 120, for instance by using a mathematical operation such as subtraction. Computing device 104 may receive proffers from the interaction platform 112, where transfer apparatuses may submit proffers to perform a requested object transfer. Computing device 104 may process proffers using a set of criteria for processing proffers, for example, setting a proffer rate, such as a maximum or minimum rate, which can be set by the object originator, transfer apparatus employer, user submitting an object transfer request 108, among others, for instance, entered from the transfer apparatus mobile electronic device, user device, etc. Computing device 104 may exchange data with the interaction platform 112, for example, establishing that a transfer apparatus submitting the highest proffer is awarded the object transfer request 108. In this way, computing device 108 may calculate a difference between compatibility metrics 120 to determine which proffer is the "highest bidder".

Continuing in reference to FIG. 1, computing device 104 selecting a proffer may include calculating a plurality of differences between pairs of proposed windows of time 132. Two or more proffers may have compatibility metrics 120 that indicate multiple transfer apparatuses are compatible with an object transfer request 108, in which case, computing device 104 may calculate a plurality of differences between the plurality of proposed windows of time 132 associated with the transfer apparatuses. Simply put, computing device 104 may calculate a plurality of differences (proffer deltas) between compatibility metrics 120 associated with proffers to select the 'best' proffer, wherein 'best' may be the highest, lowest, closest to a particular score, time, etc.

Continuing in reference to FIG. 1, selecting a proffer may include calculating a plurality of differences between a plurality of proffers according to a threshold value. Computing device 104 may calculate a proffer delta for the plurality of proffers according to a threshold value, such as a desired compatibility metric 120. For instance, a value of 100, wherein the smallest delta (difference) from that value represents the most "compatible" proffer, and thus the "highest proffer". In such an example, computing device 104 may select the transfer apparatus corresponding to that proffer.

Continuing in reference to FIG. 1, selecting and providing the object transfer request 108 may include providing the object transfer identity and the object transfer destination to the selected transfer apparatus. Object transfer request 108 may provide data to the selected transfer apparatus describing the identity of the object, an originator location, and the terminal destination associated with the object. Computing device 104 may additionally provide a transfer path as part of the object transfer request 108, such as a route traced by a plurality of locations, addresses, global positioning system (GPS) coordinates, latitudinal and/or longitudinal parameters, or the like. Computing device 104 may provide a transfer path as a part of and/or alongside an object transfer request 108 sent to the selected transfer apparatus. Object transfer request 108 may be communicated to transfer apparatus via interaction platform 112; similarly, object transfer request 108 may be provided via a mobile application such as a mapping application, the Internet such as an e-mail notification, among other methods.

Continuing in reference to FIG. 1, providing the object transfer request 108 may include removing the object transfer request 108 from the plurality of unfinished object transfer requests 108. Computing device 104 may terminate the virtual space for a request at the threshold value of time for accepting a proffer and remove the corresponding object transfer request 108 from the interaction platform 112 once a proffer is selected.

Figure 2:
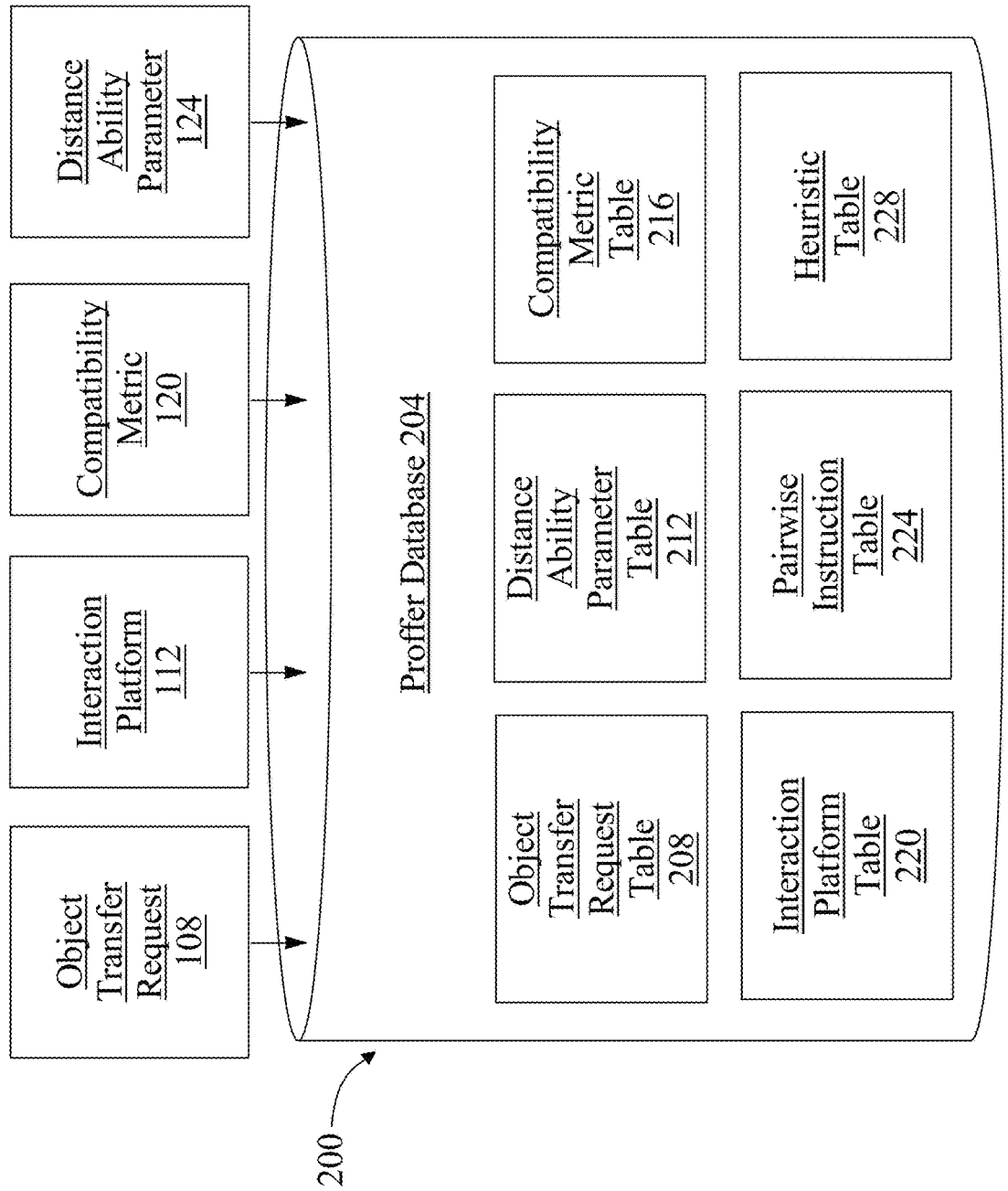
FIG. 2 is a block diagram illustrating an exemplary embodiment of a proffer database.

Referring now to FIG. 2, non-limiting exemplary embodiment 200 of a proffer database 204 is illustrated. Computing device 104 may store and/or retrieve object transfer request 108 data, compatibility metrics 120, transfer apparatus data such as distance ability parameters 124, transfer paths, among other determinations, I/O data, and the like, in a proffer database 204. Proffer database 204 may be implemented, without limitation, as a relational database, a key-value retrieval database such as a NOSQL database, or any other format or structure for use as a database that a person skilled in the art would recognize as suitable upon review of the entirety of this disclosure. Proffer database 204 may alternatively or additionally be implemented using a distributed data storage protocol and/or data structure, such as a distributed hash table and the like. Proffer database 204 may include a plurality of data entries and/or records, as described above. Data entries in a proffer database 204 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure. Computing device 104 may retrieve any determinations, as described herein, from the proffer database 204, such as object transfer requests 108, compatibility metrics 120, distance ability parameters 124, and the like.

Further referring to FIG. 2, proffer database 204 may include, without limitation, an object transfer request table 208, distance ability parameter table 212, compatibility metric table 216, interaction platform table 220, pairwise instruction table 224, and/or heuristic table 228. Determinations by a machine-learning process, machine-learning model, ranking function, and/or mapping algorithm, may also be stored and/or retrieved from the proffer database 204, for instance in non-limiting examples, optimized routes for transfer apparatus to complete object transfer request 108. As a non-limiting example, proffer database 204 may organize data according to one or more instruction tables. One or more proffer database 204 tables may be linked to one another by, for instance in a non-limiting example, common column values. For instance, a common column between two tables of proffer database 204 may include an identifier of a submission, such as a form entry, textual submission, accessory device tokens, local access addresses, metrics, and the like, for instance as defined herein; as a result, a search by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 2, in a non-limiting embodiment, one or more tables of an proffer database 204 may include, as a non-limiting example, an object transfer request table 208, which may include categorized identifying data, as described above, including object identities, terminal destinations associated with object transfer request, object originator locations, and the like. One or more tables may include distance ability parameter table 212, which may include data regarding the amount of time left on an individual's work shift and/or a work schedule for an individual, transfer apparatus data such as distance range capabilities, and the like, for instance and without limitation, that system 100 may use to retrieve and/or store parameters for determining compatibility metrics 120. One or more tables may include compatibility metric table 216, which may include compatibility metrics 120, probabilities of likelihoods for successful object transfer, and the like, that system 100 may use for vetting proffers. One or more tables may include interaction platform table 220, which may include files of object transfer requests 108 organized based on their status, and lists of pending proffers, and the like, as described above for instance and without limitation, that system 100 may use to retrieve, sort, and/or store. One of more tables may include a pairwise instruction table 224, which may include instructions, numerical values, and/or outputs, determinations, variables, and the like, organized into subsets of data for generating instructions for selecting proffers. One or more tables may include, without limitation, a heuristic table 228, which may organize rankings, scores, models, outcomes, functions, numerical values, arrays, matrices, and the like, that represent determinations, probabilities, metrics, parameters, and the like, include one or more inputs describing potential mathematical relationships, as described herein.

Figure 3:
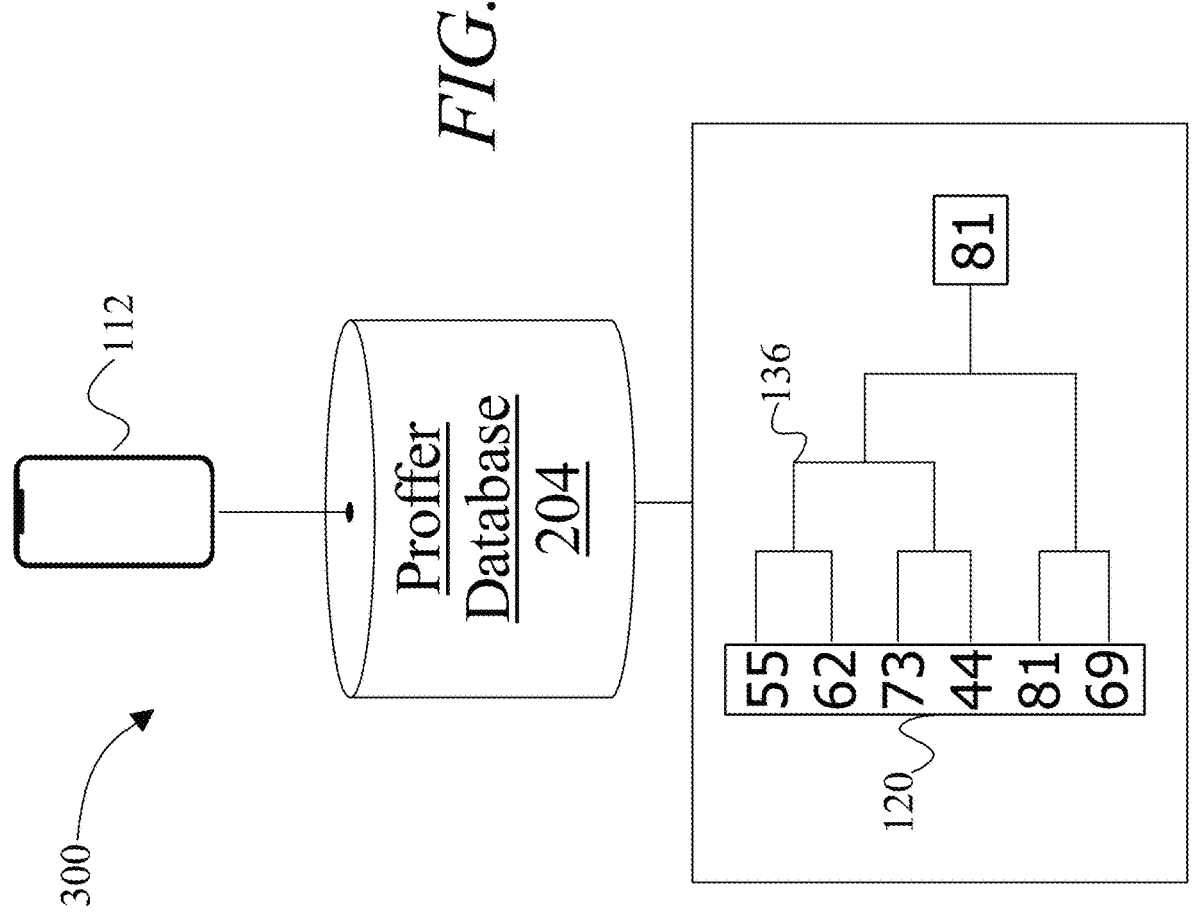
FIG. 3 is a diagrammatic representation illustrating an exemplary embodiment of pairwise comparison of a plurality of compatibility metrics.

Referring now to FIG. 3, a non-limiting exemplary embodiment 300 of pairwise comparison of a plurality of compatibility metrics is illustrated. A plurality of proffers may be input via interaction platform 112 and sorted among a proffer database 204. Proffers may be input into interaction platform 112 for instance via a user device, as described in further detail below. Plurality of proffers may be associated with a plurality of compatibility metrics 120 associated with an object transfer request 108. Computing device 104 may compare compatibility metrics 120 by performing a pairwise operation using a pairwise operation instruction 136, such as subtracting compatibility metrics 120, contained in the proffer, from one another. Pairwise operation instruction 136 may include, for instance in FIG. 3, comparing two compatibility metrics 120 by subtraction, and selecting the proffer associated with the compatibility metric 120 that is the greater numerical value. Computing device 104 may arrange compatibility metrics 120 in a variety of ways, such as a list, array, among other forms, to enhance the performance of the pairwise operation and make selecting a proffer more accurate.

Figure 4:
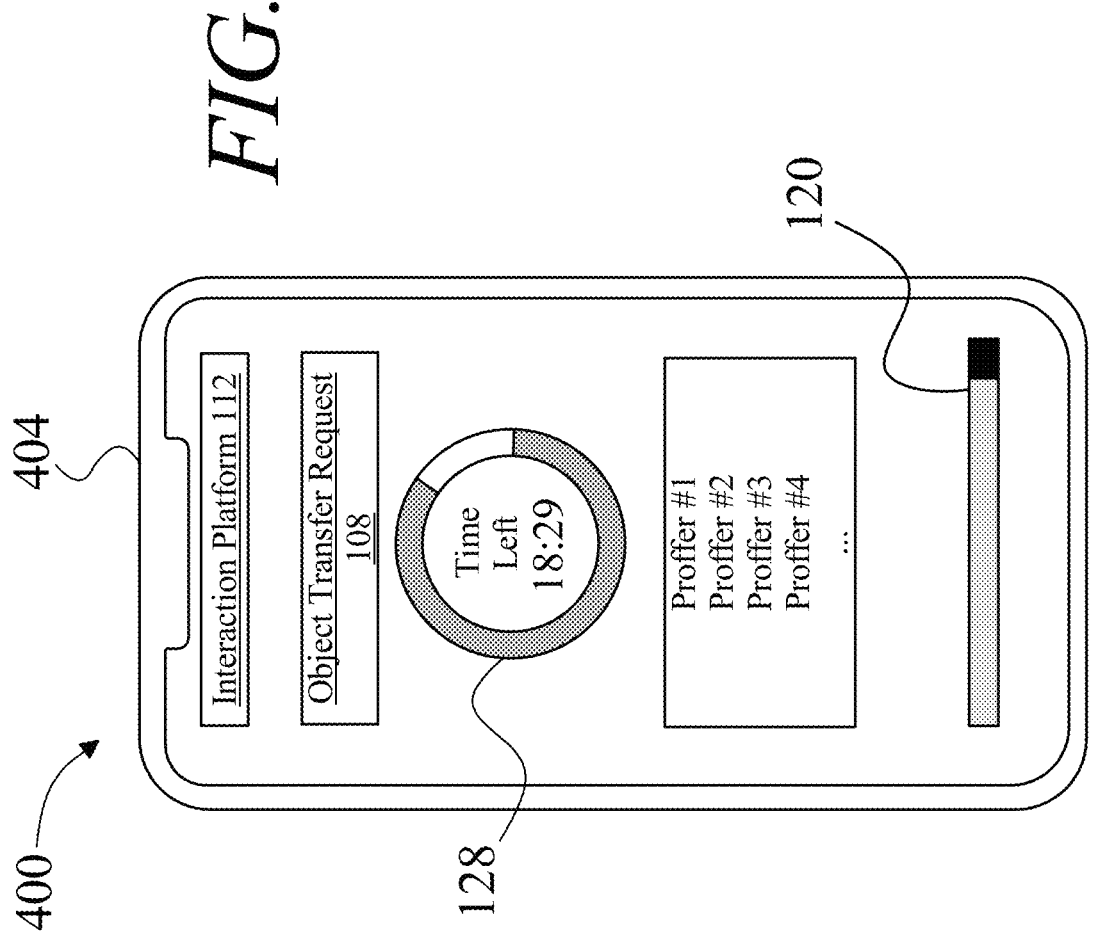
FIG. 4 is a diagrammatic representation illustrating an exemplary embodiment of a transfer apparatus device.

Referring now to FIG. 4, a non-limiting exemplary embodiment 400 of a user device 404 is illustrated. User device 404 may be the same as computing device 104. User device 604 may include transfer apparatus device. User device 404 may include a "smartphone", mobile cellular device, laptop, tablet computer, internet-of-things (JOT) integrated device, or any other device compatible with system 100, as described herein. User device may provide the transfer apparatus corresponding to the selected proffer the object transfer request 108. User device 404 may generate a representation, for instance via a graphical user interface, of an object transfer request 108, wherein the request includes a position on a map, an address, an object identity, etc. Interaction platform 112 may display via the user device 404 a plurality of proffers associated with object transfer request 108. Interaction platform 112 may display a threshold value of time 128, for instance for displaying the time left for submitting a proffer. Interaction platform 112 may display a compatibility metric 120 associated with a transfer apparatus, for instance to inform a transfer apparatus in submitting a proffer.

Figure 5:
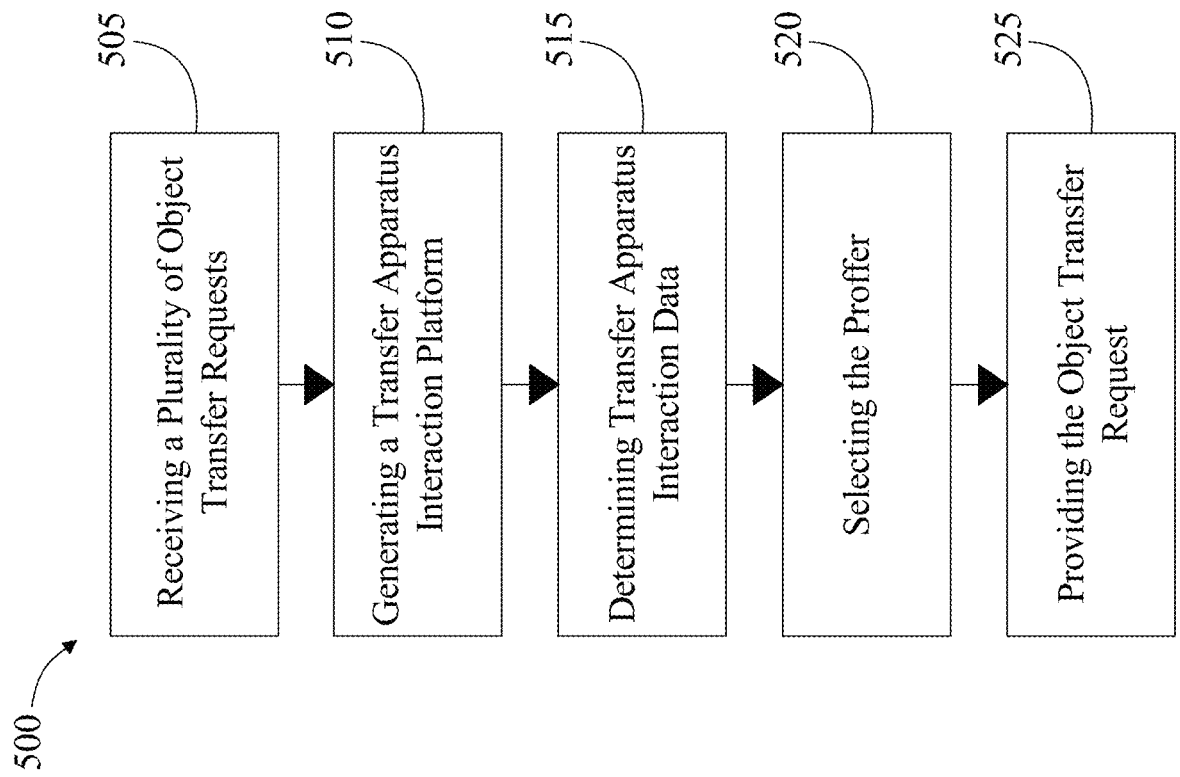
FIG. 5 is a flow diagram illustrating an exemplary workflow of a method for initiating object transfer.

Referring now to FIG. 5, an exemplary embodiment of a method 700 for initiating object transfer. At step 505, computing device 104 is configured for receiving a plurality of object transfer requests 108, wherein the plurality of object transfer requests 108 includes a plurality of object identities and a plurality of object destinations; this may be implemented, without limitation, as described above in FIGS. 1-4.

Still referring to FIG. 5, at step 510, computing device 104 is configured for generating, using the plurality of object transfer requests 108, a transfer apparatus interaction platform 112 for a plurality of transfer apparatuses to proffer at least an object transfer request 108; this may be implemented, without limitation, as described above in FIGS. 1-4.

Continuing in reference to FIG. 5, at step 515, computing device 104 is configured for determining transfer apparatus interaction data 116 via the transfer apparatus interaction platform 112, wherein the transfer apparatus interaction data 116 includes a proffer of an object transfer request 108, a proposed window of time 132 for object transfer, and an object transfer compatibility metric 120, wherein the compatibility metric 120 is determined as a function of receiving, from the transfer apparatus, at least a distance ability parameter 124 corresponding to the distance a transfer apparatus is able to traverse. Generating transfer apparatus interaction platform 112 may include determining a time frame for the plurality of transfer apparatuses to provide at least a proffer and providing to the plurality of transfer apparatuses at least an unfinished object transfer request 108. Determining transfer apparatus interaction data 116 via the transfer apparatus interaction platform 112 may include generating a threshold value of time 128 for accepting the proffer of an object transfer request 108 from the plurality of transfer apparatuses. The transfer apparatus interaction data 116 may be displayed to the plurality of transfer apparatuses via the transfer apparatus interaction platform. Determining transfer apparatus interaction data 116 may include generating a list of available transfer apparatuses as a function of the plurality of compatibility metrics 120 for performing the plurality of object transfer requests 108. Determining the proposed window of time 132 for object transfer may include determining, from the list of available transfer apparatus, a first position for the transfer apparatuses and generating the proposed window of time 132 for object transfer for the transfer apparatus as a function of the first position. Determining the object transfer compatibility metric 120 may include receiving the at least a distance ability parameter associated with the transfer apparatus, calculating a probability describing a likelihood the transfer apparatus with the corresponding distance ability parameter will perform the object transfer prior to a maximal time for the object transfer, wherein the maximal time represents an anticipated object transfer time, and determining the compatibility metric as a function of the distance ability parameter and the probability; this may be implemented, without limitation, as described above in FIGS. 1-4.

Continuing in reference to FIG. 5, at step 520, computing device 104 is configured for selecting the proffer from a plurality of proffers from the plurality of transfer apparatuses, wherein selecting includes calculating a difference between the plurality of object transfer compatibility metrics 120 associated with the plurality of proffers using a pairwise operation. Selecting the transfer apparatus interaction data 116 may include generating a pairwise operation instruction 136 for selecting the proffer as a function of the plurality of compatibility metrics 120; this may be implemented, without limitation, as described above in FIGS. 1-4.

Continuing in reference to FIG. 5, at step 525, computing device 104 is configured for providing the transfer apparatus corresponding to the selected proffer the object transfer request 108. Providing at least a transfer apparatus the object transfer request 108 may include selecting the transfer apparatus corresponding to the selected proffer. Providing the object transfer request 108 may include providing the object transfer identity and the object transfer destination to the selected transfer apparatus and removing the object transfer request 108 from the plurality of unfinished object transfer requests 108; this may be implemented, without limitation, as described above in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
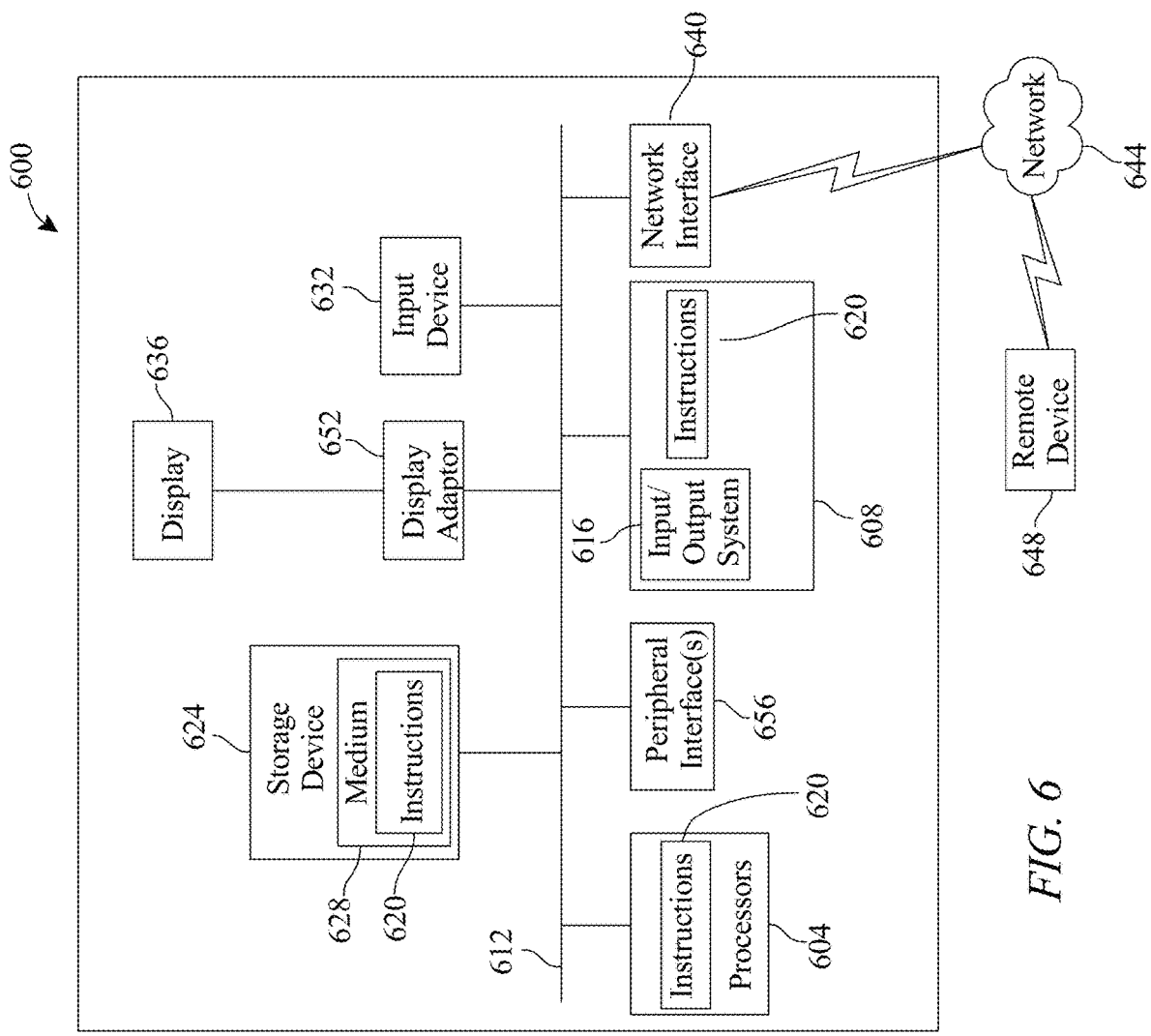
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for initiating object transfer, the system comprising:
    a computing device, wherein the computing device is configured to:
    receive a plurality of object transfer requests, wherein the plurality of object transfer requests comprises a plurality of object identities and a plurality of object destinations;
    generate, using the plurality of object transfer requests, a transfer apparatus interaction platform for a plurality of transfer apparatuses to proffer at least an object transfer request;
    determine a plurality of transfer apparatus interaction data having a plurality of proffers of object transfer requests, wherein determining further comprises determining, for each transfer apparatus of the plurality of transfer apparatuses:
    a transfer apparatus proffer of an object transfer request;
    a proposed window of time for object transfer; and
    an object transfer compatibility metric, wherein determining the compatibility metric further comprises:
        as a function of receiving, from the transfer apparatus, at least a distance ability parameter corresponding to the distance a transfer apparatus is able to traverse;
        training a machine learning model as a function of training data and the distance ability parameter, wherein the training data correlates the distance ability parameter to the transfer apparatus;
        determining, using the trained machine learning model, the compatibility metric as a function of the machine learning model and the distance ability parameter;
    select a proffer from the plurality of proffers from the plurality of transfer apparatuses,
    wherein selecting comprises:
        calculating a plurality of differences between pairs of object transfer compatibility metrics of the plurality of object transfer compatibility metrics; and
        selecting the proffer as a function of the plurality of differences; and
    a user device, operating on the computing device, wherein the user device is configured to provide to the transfer apparatus corresponding to the selected proffer the object transfer request, wherein the user device comprises a graphical user interface (GUI) coupled to the transfer apparatus interaction platform and configured to interactively display:
    the object transfer request;
    at least one of the plurality of proffers;
    the object transfer compatibility metric associated with a particular transfer apparatus; and
    a time remaining for proffer submission.

2. The system of claim 1, wherein generating the transfer apparatus interaction platform further comprises:
    determining a time frame for the plurality of transfer apparatuses to provide the plurality of proffers; and
    providing to the plurality of transfer apparatuses at least an unfinished object transfer request.

3. The system of claim 1, wherein determining transfer apparatus interaction data via the transfer apparatus interaction platform further comprises generating a threshold value of time for accepting the proffer of the object transfer request from the plurality of transfer apparatuses.

4. The system of claim 1, wherein the transfer apparatus interaction data is displayed to the plurality of transfer apparatuses via the transfer apparatus interaction platform.

5. The system of claim 1, further comprising generating a list of available transfer apparatuses as a function of the plurality of compatibility metrics for performing the plurality of object transfer requests.

6. The system of claim 5, wherein determining the proposed window of time for object transfer further comprises:
    determining, from the list of available transfer apparatus, a first position for the transfer apparatuses; and
    generating the proposed window of time for object transfer for the transfer apparatus as a function of the first position.

7. The system of claim 1, wherein determining the object transfer compatibility metric further comprises:
    receiving the at least a distance ability parameter associated with the transfer apparatus;
    calculating a likelihood the transfer apparatus with the corresponding distance ability parameter will perform the object transfer before a maximal time for the object transfer, wherein the maximal time represents an expected object transfer time; and
    determining the compatibility metric as a function of the distance ability parameter and the likelihood.

8. The system of claim 1, wherein selecting the proffer further comprises:
    generating a pairwise operation instruction for selecting the proffer as a function of the plurality of compatibility metrics; and
    executing the pairwise operation instruction to perform a successive pairwise comparison between two object transfer compatibility metrics of the plurality of object transfer compatibility metrics and determine the selected proffer.

9. The system of claim 8, wherein providing the object transfer request further comprises selecting the transfer apparatus corresponding to the selected proffer.

10. The system of claim 1, wherein providing the object transfer request further comprises:
    providing the object transfer identity and the object transfer destination to the selected transfer apparatus; and
    removing the object transfer request from the plurality of unfinished object transfer requests.

11. A method for initiating object transfer, the method comprising:
- receiving, by a computing device, a plurality of object transfer requests, wherein the plurality of object transfer requests comprises a plurality of object identities and a plurality of object destinations;
- generating, by a computing device, using the plurality of object transfer requests, a transfer apparatus interaction platform for a plurality of transfer apparatuses to proffer at least an object transfer request;
- determining, by the computing device, a plurality of transfer apparatus interaction data having a plurality of proffers of object transfer requests, wherein determining further comprises determining, for each transfer apparatus of the plurality of transfer apparatuses:
  - a transfer apparatus proffer of an object transfer request;
  - a proposed window of time for object transfer; and
  - an object transfer compatibility metric, wherein determining the compatibility metric further comprises:
    - as a function of receiving, from the transfer apparatus, at least a distance ability parameter corresponding to the distance a transfer apparatus is able to traverse;
    - training a machine learning model as a function of training data and the distance ability parameter, wherein the training data correlates the distance ability parameter to the transfer apparatus;
    - determining, using the trained machine learning model, the compatibility metric as a function of the machine learning model and the distance ability parameter;
- selecting, by the computing device, a proffer from the plurality of proffers from the plurality of transfer apparatuses,
  - wherein selecting comprises:
    - calculating a plurality of differences between pairs of object transfer compatibility metrics of the plurality of object transfer compatibility metrics; and
    - selecting the proffer as a function of the plurality of differences; and
- providing, by a user device operating on the computing device, to the transfer apparatus corresponding to the selected proffer the object transfer request, wherein the user device comprises a graphical user interface (GUI) coupled to the transfer apparatus interaction platform and configured to interactively display:
  - the object transfer request;
  - at least one of the plurality of proffers;
  - the object transfer compatibility metric associated with a particular transfer apparatus; and
  - a time remaining for proffer submission.

12. The method of claim 11, wherein generating the transfer apparatus interaction platform further comprises:
- determining a time frame for the plurality of transfer apparatuses to provide the plurality of proffers; and
- providing to the plurality of transfer apparatuses at least an unfinished object transfer request.

13. The method of claim 11, wherein determining transfer apparatus interaction data via the transfer apparatus interaction platform further comprises generating a threshold value of time for accepting the proffer of the object transfer request from the plurality of transfer apparatuses.

14. The method of claim 11, wherein the transfer apparatus interaction data is displayed to the plurality of transfer apparatuses via the transfer apparatus interaction platform.

15. The method of claim 11, further comprising generating a list of available transfer apparatuses as a function of the plurality of compatibility metrics for performing the plurality of object transfer requests.

16. The method of claim 15, wherein determining the proposed window of time for object transfer further comprises:
- determining, from the list of available transfer apparatus, a first position for the transfer apparatuses; and
- generating the proposed window of time for object transfer for the transfer apparatus as a function of the first position.

17. The method of claim 11, wherein determining the object transfer compatibility metric further comprises:
- receiving the at least a distance ability parameter associated with the transfer apparatus;
- calculating a likelihood the transfer apparatus with the corresponding distance ability parameter will perform the object transfer before a maximal time for the object transfer, wherein the maximal time represents an expected object transfer time; and
- determining the compatibility metric as a function of the distance ability parameter and the likelihood.

18. The system of claim 1, wherein selecting the proffer further comprises:
- generating a pairwise operation instruction for selecting the proffer as a function of the plurality of compatibility metrics; and
- executing the pairwise operation instruction to perform a successive pairwise comparison between two object transfer compatibility metrics of the plurality of object transfer compatibility metrics and determine the selected proffer.

19. The method of claim 18, wherein providing the object transfer request further comprises selecting the transfer apparatus corresponding to the selected proffer.

20. The method of claim 11, wherein providing the object transfer request further comprises:
- providing the object transfer identity and the object transfer destination to the selected transfer apparatus; and
- removing the object transfer request from the plurality of unfinished object transfer requests.

* * * * *